United States Patent [19]
Scharf

[11] 3,778,835
[45] Dec. 11, 1973

[54] BEARING DETECTION SYSTEM
[75] Inventor: Gerson Scharf, Fairfax, Va.
[73] Assignee: Computer Sciences Corporation, Paramus, N.J.
[22] Filed: Apr. 20, 1971
[21] Appl. No.: 135,611

[52] U.S. Cl. .................. 343/113 R, 343/113 DE
[51] Int. Cl. ............................................. G01s 3/46
[58] Field of Search ................. 343/113 R, 113 DE

[56] References Cited
UNITED STATES PATENTS

| | | | |
|---|---|---|---|
| 3,550,130 | 12/1970 | Shaw | 343/113 DE |
| 2,296,041 | 9/1942 | Luck | 343/117 R |
| 2,208,379 | 7/1940 | Luck | 343/117 R |
| 3,553,698 | 1/1971 | Keller | 343/113 R |
| 3,298,027 | 1/1967 | Stover | 343/113 DE |
| 3,528,070 | 9/1970 | Young | 343/11 VB |

Primary Examiner—Benjamin A. Borchelt
Assistant Examiner—Denis H. McCabe
Attorney—Beveridge & DeGrandi

[57] ABSTRACT

A system for determining the bearing of aircraft traveling in formation with respect to a master aircraft leading the formation. The master aircraft has a transmitter located thereon while each craft in formation has at least a pair of spaced-apart receiver means located thereon. If the craft are helicopters, each receiver means of a pair of receiver means is located at the respective end of a rotary blade of the helicopter. If the craft do not have rotary blades the receiver means are stationarily located and successive pairs of receiver means are successively sampled so that with respect to the spaced receiver means the equivalent apparent rotation is achieved. At the time when the signals from the transmitter arrive at both receiver means of a pair of receiver means at the same instant of time it is known that a line from the transmitter to the midpoint of a line connecting the pair of receiver means is perpendicular to the line connecting the pair of receiver means and the bearing is determined.

4 Claims, 5 Drawing Figures

INVENTOR
GERSON SCHARF

INVENTOR
GERSON SCHARF

BY Beveridge & DeGrandi
ATTORNEYS

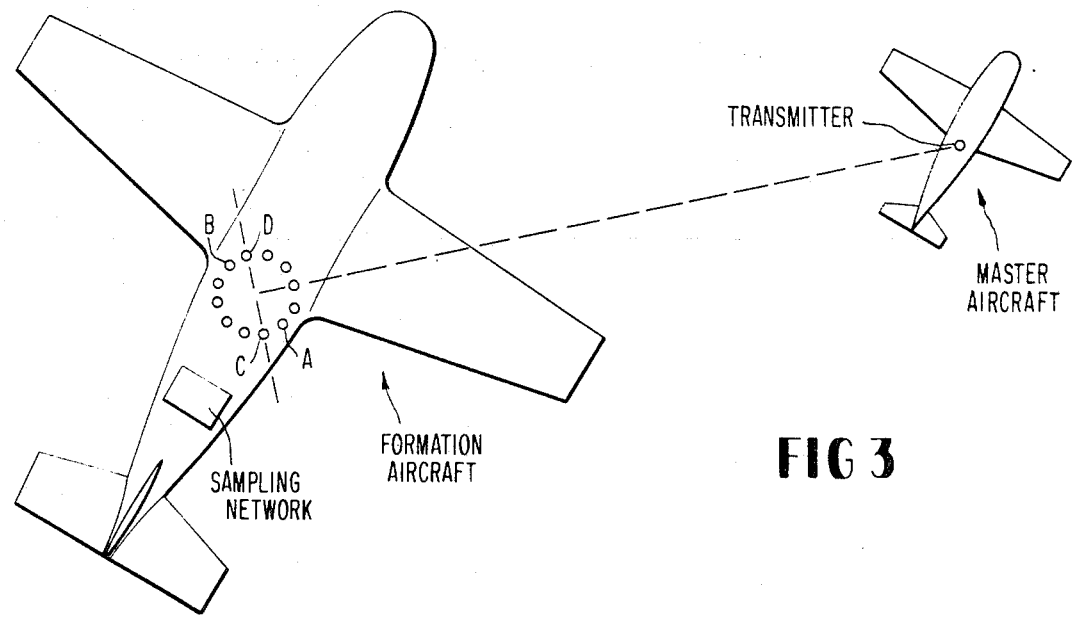
FIG 3
FIG. 4
EPOCH CONSTRUCTION
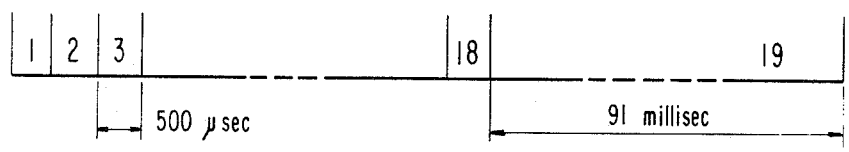
FIG. 5  SMALL TIME SLOT
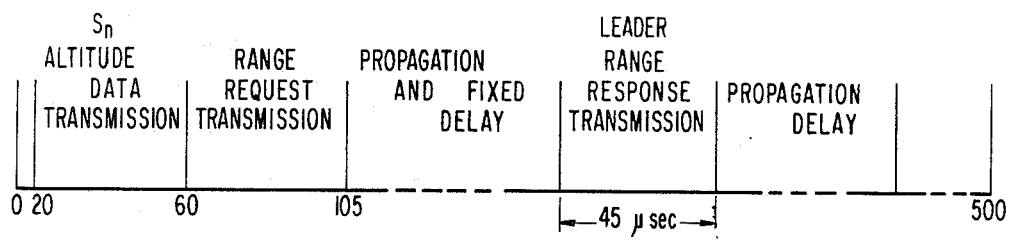
INVENTOR
GERSON SCHARF
BY Beveridge & De Granti
ATTORNEYS

BEARING DETECTION SYSTEM

This invention relates to an improved system for determining the bearing or direction of one vehicle with respect to another vehicle. It is particularly applicable to the determination of the bearing of aircraft, such as, for instance, helicopters or airplanes, flying in formation. The bearing detection system of the present invention may be incorporated into a full-scale station-keeping system wherein signals representative of the altitude, range, and bearing of each aircraft flying in formation are transmitted to a master aircraft several times each second. It may also be utilized in a collision avoidance system where it would be desirable to know the bearing between aircraft.

It is therefore an object of the invention to provide an improved bearing-detection system.

It is a further object to provide a bearing-detection system which can be incorporated into a full-scale station-keeping system where the relative altitudes, ranges, and bearings, of aircraft flying in formation are determined.

Briefly, the above objects are accomplished by providing one aircraft with a transmitter means and another aircraft with at least one pair of spaced-apart receiver means. At some respective bearing of the two aircraft the signals from the transmitter means will arrive at both receiver means of a pair of receiver means at the same instant of time. At the time that this occurs a line from the transmitter to the midpoint of a line connecting the pair of spaced-apart receiver means will be the perpendicular bisector of the line connecting the receiver means. If the angle between the line connecting the pair of receivers, and a line in a direction of the heading of the aircraft is then determined, the relative bearing is known. The absolute bearing, if desired, can then be determined by determining the angle between the nose of the aircraft and a reference direction.

In one embodiment of the invention, utilizing helicopters, the spaced-apart receiver means are placed at the ends of the rotary blade or rotary blades of the receiving helicopter. These rotary blades effect relative rotation of the receiver means.

In another embodiment, the spaced-apart receiver means are located on the aircraft in a stationary fashion and a sampling network is used to effect relative rotation of the pairs of receiver means.

The above-mentioned features and objects of the invention will become more apparent by reference to the following description taken in conjunction with the accompanying drawings, in which:

FIG. 3 represents an embodiment where the receivers are stationarily located in a circular configuration; and FIGS. 4 and 5 represent time slots of the station-keeping system in which the unique bearing detector may be employed.

Figure 1:
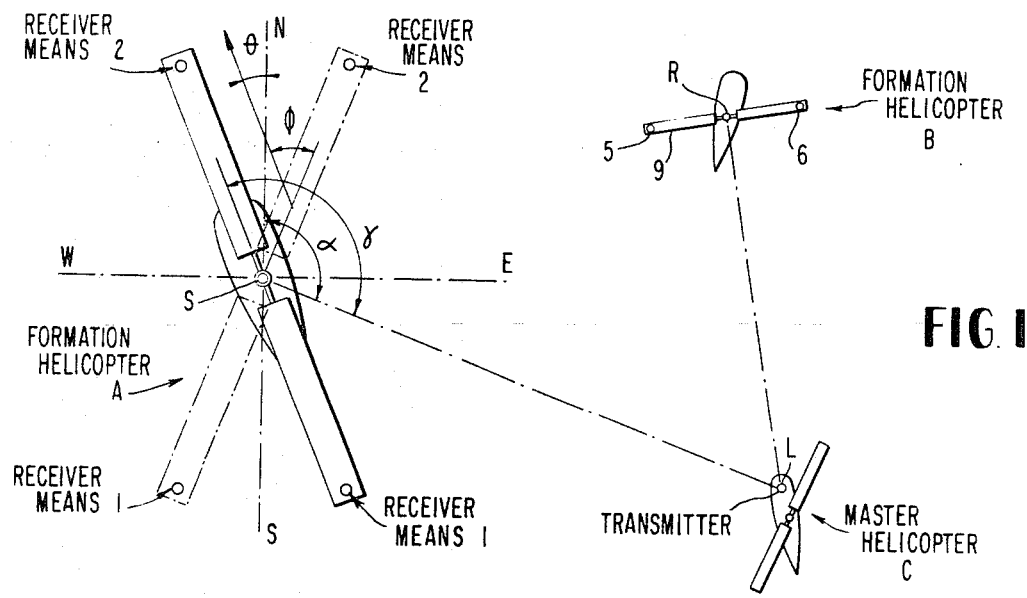
FIG. 1 represents an embodiment of the invention wherein the receiver means are located on the opposite ends of a helicopter blade.

FIG. 1 represents an embodiment of the invention where it is desired to determine the bearing of formation helicopters A and B with respect to master helicopter C which is the leader of the formation. In a practical embodiment there might be a great number of formation helicopters, perhaps 20 or more, and in such a case it would be desired to know the bearing of each formation helicopter with respect to the master helicopter.

While the embodiment of FIG. 1 shows determining the bearing between helicopters in a formation and a master helicopter, it is also within the scope of the invention to determine the position of aircraft in formation with respect to a stationary transmitting source. Thus, it might be desirable to determine the bearing of helicopters in formation with respect to a stationary master station located either on the ground or in space.

In the embodiment shown in FIG. 1, the receiver means are located at the ends of a rotary blade of a helicopter. This rotary blade is a means for relatively rotating the receiver means about a common axis. Actually, the helicopter may have more than one blade in which case paired receiver means may be located at respective ends of each rotary blade. As a practical matter, the receiver means could be antennas with the actual radio receiver or receivers located elsewhere on the craft. However, it is also within the scope of the invention to provide actual radio receivers located at the blade ends.

In FIG. 1 it is desired to determine the bearing of formation helicopters A and B with respect to master helicopter C. Master helicopter C has a transmitter means located on it which transmits radio pulses toward formation helicopters A and B. Line LS in FIG. 1 is a line from the transmitter of master helicopter C to a point on rotary blade 8 which is midway between receiver means 1 and 2. The angle between the line LS and the helicopter blade 8 is the angle $\gamma$. It is apparent that at some time during a 180° rotation of blade 8, line LS will become perpendicular to the direction of the blade. Thus, in FIG. 1, helicopter blade 8 is shown in positions 1 and 2. Position 1 illustrates a time in the rotation of the blade when the angle $\gamma$ is at a value not equal to 90°. However, as the blade moves in a clockwise direction from position 1 to position 2, the angle $\gamma$ moves closer to 90° until at position 2, $\gamma$ is equal to 90° and the line LS is the perpendicular bisector of the rotary blade 8. At this instant of time the pulses incident on receiver means 1 and 2 will arrive at the same time. This is because at this time receiver means 1 and 2 are at the same distance from the transmitter. Thus, if we can determine at this time the angle $\phi$, which is the angle between the rotary blade and the line in the direction of the heading of the helicopter, we can determine the relative bearing of the formation helicopter with respect to the master helicopter. This relative bearing angle in this case is $90° + \phi$. We can further determine the absolute bearing angle by substracting from the relative bearing angle the angle that the line in the direction of the heading of the craft makes with the reference direction. This angle in FIG. 1 is the angle $\theta$, and so in FIG. 1 the absolute bearing angle will be equal to $90° + \phi - \theta$. $\theta$, of course, can be determined by a standard direction sensor such as a compass or gyroscope. $\phi$, the angle between the rotor blade and the direction of the heading of the helicopter can be determined by any standard device used for determining the instantaneous position of a rotating shaft, such as a magnetic or optical shaft encoder.

If the master helicopter, instead of being at the bearing shown in FIG. 1, was located at a bearing 180° displaced from the bearing shown in FIG. 1, the new line LS would also be the perpendicular bisector of blade 8 and the same bearing reading would result. This ambiguity can be resolved by sampling the receiver means a fraction of a revolution after the time when the signals arrive simultaneously, and noting at this later time at which receiver means the signals arrive first. Thus, in the position shown in FIG. 1, assuming clockwise rotation, a fraction of a second after the signals arrive at both receiver means simultaneously, receiver means 2 will be closer to the transmitter than receiver means 1 and hence the signals will arrive at receiver means 2 before they arrive at receiver means 1. Thus it is determined that the master helicopter is at the bearing shown in FIG. 1. Conversely, if the master helicopter had been displaced 180° from the bearing shown in FIG. 1 (to the left and above helicopter A instead of to the right and below it) receiver means 1 would receive the signals first a fraction of a revolution after the signals arrive simultaneously.

In FIG. 1 it is also desired to determine the bearing of formation helicopter B with respect to the master helicopter. This is done in the same way as described in conjunction with formation helicopter A. Formation helicopter B in FIG. 1 is pictured at an instant in time when line LR, the line from the transmitter to the midpoint of rotor blade 9, is the perpendicular bisector of blade 9. At this time, if the corresponding angles $\phi$ and $\theta$ are determined, the absolute bearing angle $\alpha$ is known.

Figure 2:
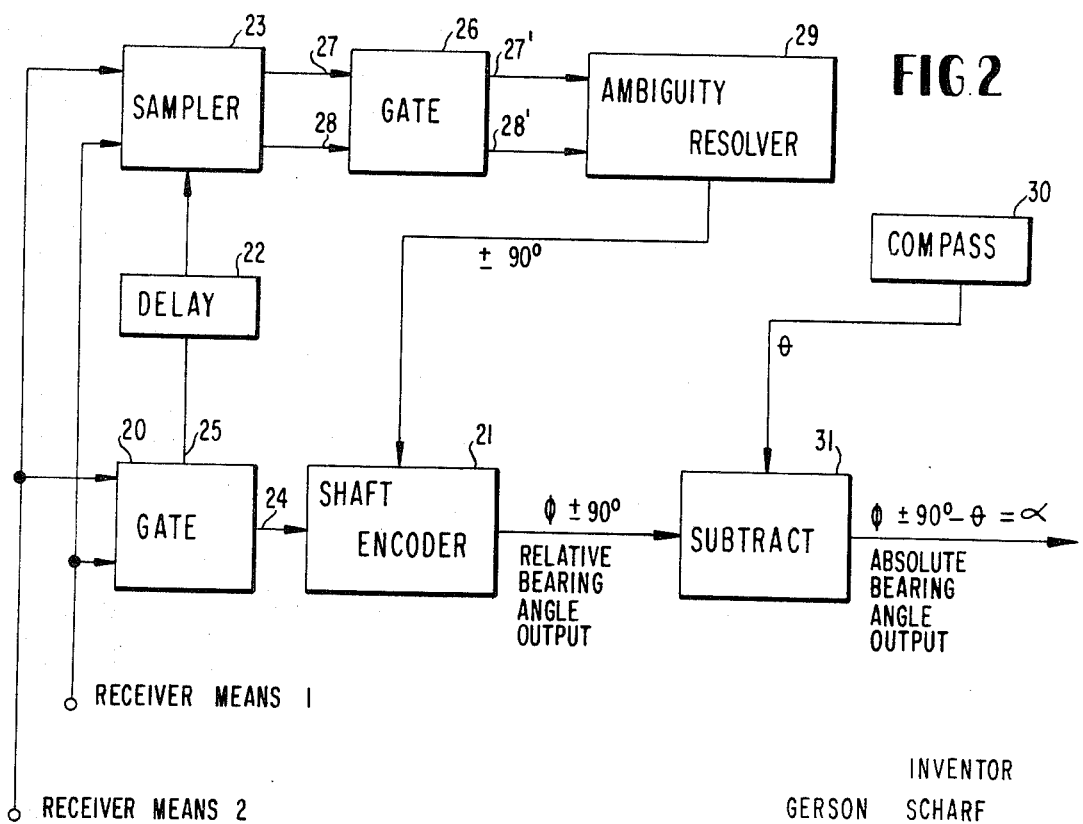
FIG. 2 represents the system used to compute the angle of bearing of the system shown in FIG. 1.

FIG. 2 shows an electronic system for computing the bearings of the helicopters shown in FIG. 1. The outputs of receiver means 1 and 2 are connected to the inputs of coincidence gate 20. Gate 20 produces output signals at outputs 24 and 25 only when the input signals to the gate are coincident, that is only when the pulse signals from the transmitter source arrive at receiver means 1 and 2 simultaneously. This would, of course, correspond to a position of the helicopter blade when a line from the transmitter to the midpoint of a line connecting the two receiver means would be the perpendicular bisector of the latter line. Shaft encoder 21, as mentioned above, is a standard magnetic or optical shaft encoder which is connected to the shaft of the helicopter blades which continuously provides an indication of the rotary position of the blade with respect to the heading of the helicopter. Shaft encoder 21 is designed to provide an output signal to subtractor gate 31 only when it is activated by the signal on output 24 of gate 20. At the same time that an output signal appears at output 24 of gate 20, one will also appear at output 25. The signal at output 25 will be delayed for a time equivalent to a fraction of a revolution of the blade in delay network 22. The output of delay network 22 is fed into sampler 23 which samples receier means 1 and 2 a fraction of a revolution after the signals from the transmitter arrive at the receiver means simultaneously, to determine whether the signals are arriving at receiver means 1 or receiver means 2 first. The sampled outputs of receiver means 1 and 2 are then fed into inputs 28 and 27, respectively, of gate 26. Gate 26 is a standard block within the skill of the ordinary person in the art, designed so that if the sampled outputs of receiver means 1 and 2 indicate that the transmitter signals are arriving at receiver means 2 first, gate 26 will have an output on line 27'. Conversely, if the transmitter signals are arriving at receiver means 1 first, an output signal will appear at 28'. If the output appears at 27', this indicates, assuming clockwise rotation of the blade, that the ambiguity is resolved in favor of the bearing of the master helicopter shown in FIG. 1. On the other hand, if the output appears at 28' it would indicate that the bearing of the master helicopter would be 180° displaced from the bearing shown at FIG. 1.

Ambiguity resolver 29 is a signal generating unit designed to generate a signal representative of the angle +90°, or the angle −90°. Assuming $\gamma$ to be +90°, for the combination shown in FIG. 1, unit 29 will generate a signal representative of +90° when the output of gate 26 appears at 27' and a signal representative of −90° when the output of gate 26 appears at 28' of gate 26. The output of ambiguity resolver 29 is fed into shaft encoder 21 where it combines with a signal representative of the angle $\phi$ sensed by shaft encoder 21 to product a shaft encoder output of $\phi \pm 90°$, which output is representative of the relative bearing angle.

To determine the absolute bearing angle a signal representative of the angle $\theta$, the angle between the heading of the aircraft and the reference direction must be combined with the signal representative of the relative bearing angle. For the configuration shown in FIG. 1 this angle is subtractively combined with the relative bearing angle. Thus in FIG. 2 compass 30 provides an electrical output signal proportional to the angle $\theta$, which signal is subtractively combined with the output of shaft encoder 21 in subtractor gate 31 to provide a signal representative of the absolute bearing angle.

FIG. 3 shows an embodiment of the invention employed on aircraft not having rotary wings. It is to be noted that the embodiment of FIG. 3 is not restricted to use with aircrat and could be used to determine the bearings of any moving vehicles such as ships or land vehicles. In the embodiment of FIG. 3 the receiver means are stationarily mounted on the aircraft bodies and corresponding pairs of receiver means are sampled several hundred times each minute to effect relative rotation. Thus, in FIG. 3, receiver pairs A–B, C–D, etc. are sequentially sampled to effect relative rotation. FIG. 3 is pictured an instant time when the line from the transmitter is the perpendicular bisector of the line between receiver means C and D and the transmitter signals arrive at receivers C and D at the same time. There is a network in the aircraft which has in it stored the angles between the line A–B, C–D, etc., and a line in the direction of the heading of the aircraft. These angles correspond to the angle $\phi$ in FIG. 1. To determine either the relative bearing angle or the absolute bearing angle, an electronic network similar to the network shown in FIG. 2 would be employed.

It is apparent that the accuracy of the "stationary receiver" system increases as more receiver means are added. Thus, the embodiment shown in FIG. 3 in which pairs of receivers are circularly positioned attains the effect of a true rotary wing as the number of receiver means is increased to the point where there is a receiver means located at every conceivable point on the periphery of the circle.

FIGS. 4 and 5 are useful in describing a complete station keeping system with which the novel bearing detector of the present invention may be used. In a formation in which there are N aircraft, each represented by $S_n$ and the master or flight leader represented by M, it is required that the aircraft be provided with sufficient information to determine at least several times each second (a) the range between $S_n$ and M, (b) the altitude differential between $S_n$ and M, (c) the bearing between $S_n$ and M, and (d) the heading and drift angle of M, all within acceptable RMS air tolerances.

The time hierarchy for the station keeping system is partitioned into epochs as shown in FIG. 4. Each epoch is partitioned into N-1 short time slots and one long time slot. Each aircraft $S_1$, $S_2$, $S_3$, etc. is assigned a short time slot in which it transmits and receives altitude and range information to the master, and a long time slot in which the master transmits the radio pulse which is used to determine bearing in the manner explained in conjunction with FIGS. 1 to 3. Aircraft within a formation can be synchronized periodically by either the leader or by another source, perhaps a ground master, or submaster, and this synchronization may take place at the station keeping frequency or at another frequency.

Assuming a design capacity of 19 aircraft in a formation flight, an epoch would consist of 18 short time slots as shown in FIG. 4 of 500 microseconds duration each and one long time slot of 91 milliseconds. The 100 millisecond epoch provides a data rate of 10 per second.

During a typical small time slot as shown in FIG. 5, the aircraft assigned to that slot transmits its altitude by means of a series of binary digits corresponding to its altitude in feet and receives the altitude of the master in like manner. The formation aircraft can be equipped with a device for computing the differential altitude of itself with respect to the master. This is followed by a range request, consisting of a unique series of perhaps 9 bits. Upon receipt of the range request, the master responds with a series of 9 bits to enable the requesting aircraft to obtain the total delay for two-way ranging plus fixed delay. Upon subtracting the fixed delay and dividing the remainder by two, the range between $S_n$ and M is determined. The master then sends his 91 millisecond pulse to determine bearing. During this 91 milliseconds, the master can also transmit coded sequences indicative of his heading and drift angle. Thus it is seen that ten times each second, range, altitude and bearing information is transmitted between each aircraft in formation and a master.

While I have described and illustrated the preferred embodiments of my invention, I wish it to be understood that I do not intend to be restricted solely thereto, but that I do intend to cover all modifications thereof which would be apparent to one skilled in the art and which come within the spirit and scope of my invention.

What is claimed is:

1. A system for determining the bearing of a rotary wing aircraft with respect to a pulse-emitting signal-transmitting source, said aircraft having a pair of spaced-apart receiver means located symmetrically thereon, means for indicating a time when a line from the transmitting source to the midpoint of a line connecting said pair of spaced-apart receiver means is perpendicular to said line connecting said pair of spaced-apart receiver means, said means for indicating comprising coincidence gate means for indicating a time when said pulses from said signal transmitting source arrive at said pair of spaced-apart receiver means at the same instant of time, means for providing a signal representative of the angle between said line from the transmitting source at said time and a reference direction, which signal is representative of the absolute bearing of said body with respect to said source, said means for providing a signal including;

means for providing a second signal representative of the angle between said line from the transmitting source at said time, and the direction of the heading of the body at said time, means for providing a third signal representative of the angle between the heading of the body at said time and said reference direction, means for providing a fourth signal indicative of one of +90° or −90°, and means for combining said second, third and fourth signals to produce said signal representative of the absolute bearing of said body with respect to said source.

2. The system of claim 1, further including means for sampling the output signals of said pair of receiver means at a time after said time but before the time when said transmitted pulses again arrive at said pair of receiver means at the same instant of time, and means responsive to said sampling means for selecting whether said means for providing a fourth signal provides a signal indicative of +90° or a signal indicative of −90°.

3. The system of claim 1, wherein said coincidence gate means has two inputs which are connected to the output signals of said pair of receiver means, said gate means being arranged to generate a coincidence signal when the output pulses of said receiver means are coincident, and shaft encoder means for providing said second signal when activated by said coincidence signal.

4. The system of claim 1, wherein said transmitting source is located on a second moving vehicle.

* * * * *